United States Patent
Lin

(10) Patent No.: US 9,361,119 B1
(45) Date of Patent: Jun. 7, 2016

(54) ACTIVE CODE COMPONENT IDENTIFICATION AND MANIPULATION FOR PREPROCESSOR VARIANTS

(75) Inventor: Xiaocang Lin, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 834 days.

(21) Appl. No.: 12/615,702

(22) Filed: Nov. 10, 2009

(51) Int. Cl.
*G06F 9/44* (2006.01)
*G06F 9/445* (2006.01)

(52) U.S. Cl.
CPC .......... *G06F 9/4401* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 2002/0184611 A1* | 12/2002 | Endejan | 717/113 |
| 2007/0011522 A1* | 1/2007 | Denniston | 714/724 |
| 2008/0028373 A1* | 1/2008 | Yang et al. | 717/140 |

* cited by examiner

Primary Examiner — Qamrun Nahar
(74) Attorney, Agent, or Firm — Nelson Mullins Riley & Scarborough LLP

(57) ABSTRACT

The present application is generally directed to mediums, methods, and systems for identifying and manipulating active code components. In exemplary embodiments, a user control interface is provided for displaying a source design which includes instructions in a preprocessor language and instructions in a source language. A resolvable preprocessor condition may be identified along with an instruction in the source language that is associated with the resolvable condition. The resolvable condition and the associated condition may be displayed, and the associated condition may be graphically indicated as controllable by the resolvable condition. A user may supply an input that provides a value for the resolvable condition. In some embodiments, instructions in the source language are displayed and, upon selection of one or more source language instructions by a user, a preprocessor condition that is associated with the selected source language instructions may be displayed.

20 Claims, 14 Drawing Sheets

```
/* Model step function */
void rtwdemo_preprocessor_step(void)
{
  /* local block i/o variables */
  real_T rtb_Add;
  real_T rtb_LeftController_merge_1;
  real_T rtb_Add1;
  real_T rtb_RightController_merge_1;

/* Sum: '<Root>/Add' incorporates:
   *  Inport: '<Root>/In1'
   *  Sin: '<Root>/Sine Wave'
   */
  rtb_Add = sin((real_T)rtwdemo_preprocessor_DWork.counter * 2.0 *
           3.1415926535897931E+000 / 40.0) + rtwdemo_preprocessor_U.In1;

/* OutputUpdate for ModelReference Block: '<Root>/Left Controller' */
  #if LINEAR
  mr_rtwdemo_lin1(&rtb_Add, &rtb_LeftController_merge_1,
             &(rtwdemo_preprocessor_DWork.LeftController_1_DWORK.rtdw));
  #endif                                  /* LINEAR */

/* OutputUpdate for ModelReference Block: '<Root>/Left Controller' */
  #if NONLINEAR
  mr_rtwdemo_nlin1(&rtb_Add, &rtb_LeftController_merge_1,
             &(rtwdemo_preprocessor_DWork.LeftController_2_DWORK1.rtdw));
  #endif                                  /* NONLINEAR */

/* Outport: '<Root>/Out1' */
  rtwdemo_preprocessor_Y.Out1 = rtb_LeftController_merge_1;
```

```
/* Model step function */
void rtwdemo_preprocessor_step(void)
{
  /* local block i/o variables */
  real_T rtb_Add;
  real_T rtb_LeftController_merge_1;
  real_T rtb_Add1;
  real_T rtb_RightController_merge_1;

/* Sum: '<Root>/Add' incorporates:
   *  Inport: '<Root>/In1'
   *  Sin: '<Root>/Sine Wave'
   */
  rtb_Add = sin((real_T)rtwdemo_preprocessor_DWork.counter * 2.0 *
    3.1415926535897931E+000 / 40.0) + rtwdemo_preprocessor_U.In1;

/* OutputUpdate for ModelReference Block: '<Root>/Left Controller' */
#if LINEAR
  mr_rtwdemo_lin1(&rtb_Add, &rtb_LeftController_merge_1,
                  &(rtwdemo_preprocessor_DWork.LeftController_1_DWORK).rtdw));
                                                                              /* LINEAR */
endif /* OutputUpdate for ModelReference Block: '<Root>/Left Controller' */
if NONLINEAR
  mr_rtwdemo_nlin1(&rtb_Add, &rtb_LeftController_merge_1,
                   &(rtwdemo_preprocessor_DWork.LeftController_2_DWORK1.rtdw));
                                                                               /* NONLINEAR */
endif /* Outport: '<Root>/Out1' */
  rtwdemo_preprocessor_Y.Out1 = rtb_LeftController_merge_1;
```

*Fig. 1*

ACTIVE CODE COMPONENT IDENTIFICATION AND MANIPULATION FOR PREPROCESSOR VARIANTS

BACKGROUND

Computer program developers often create a source design for a given programming project. A source design embodies source code which provides a computer or other electronic device with instructions for achieving desired functionality. The source code may be provided in a number of source languages, including but not limited to C++, Java, HDL, or a graphical language provided in a graphical programming environment, such as Simulink™ from the Mathworks, Inc. of Natick, Mass.

In some circumstances, the source design may contain code written in more than one language. This may occur, for example, if the code is governed by one or more preprocessor directives. A preprocessor directive is an instruction in a preprocessing language that controls whether portions of the source design are compiled. Preprocessor directives may be inserted into the source code for a number of reasons, such as when the source code includes a number of alternative implementations that may be set at compile-time.

When the source code is compiled, the source code is first passed to a preprocessor language engine. The preprocessor language engine parses the source code to identify preprocessor directives and then evaluates the directives to determine whether different segments of the source code should be compiled. Each preprocessor directive may include a condition. When the condition is satisfied, the portion of source code controlled by the preprocessor directive may become active.

For example, C source code may include preprocessor directives preceded by a '#' sign, as in the exemplary source code below:
if A==1
call_routine1(var1);
else
call_routine2(var1);
endif In the example, above, the preprocessor language engine may evaluate the value of the variable "A". "A" may be, for example, an environmental variable. If the value of "A" is "1", the preprocessor language engine inserts the line "call_routine1(var1);" into the source code at the point in the source code where the preprocessor directive was encountered. If the value of "A" is not "1," then the preprocessor language engine inserts the line "call_routine2(var1);" into the source code at the point that the preprocessor directive was encountered. This means, for example that if A==1 is true, then the C compiler receives "call_rountine1(var1);" but not "call_routine2(var1);".

Once the preprocessor language engine has identified and processed the preprocessor directives present in the source code, the preprocessor language engine sends the modified source code to a compiler for compilation.

BRIEF DESCRIPTION OF THE DRAWINGS

FIG. 1 depicts an exemplary source design 100 including instructions in a source language and instructions in a preprocessor language.

DETAILED DESCRIPTION

Figure 2:
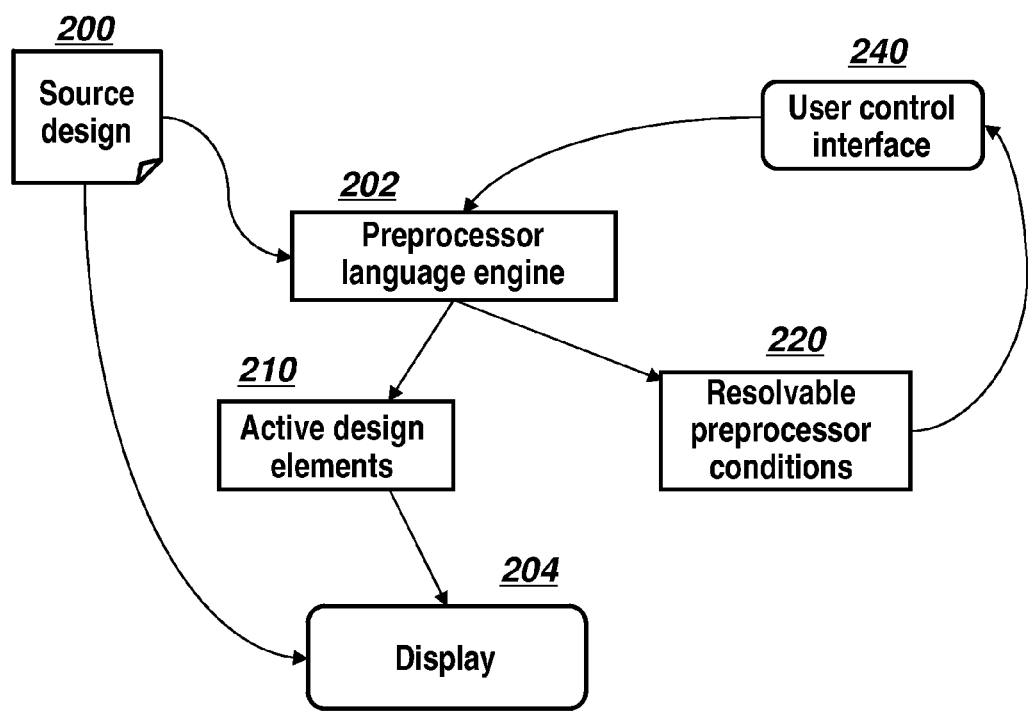
FIG. 2 graphically depicts a high-level process for displaying active design elements for a source design and receiving user input to resolve unspecified preprocessor conditions.

A user may wish to identify which preprocessor-controlled code segments in a source design are active at edit-time, at compile-time, or at run-time. However, source code including preprocessor directives can be complicated and difficult for users to understand. Further, the preprocessor directives may be distributed throughout the generated code and can therefore be difficult to locate and debug. Moreover, a user may wish to modify a condition in a preprocessor directive, for example by supplying a value for a valueless preprocessor condition, or by overriding a previously defined preprocessor condition. In this way, the user may control which portions of the source design are active, thereby implementing alternate versions of the source design.

Conventional systems may not provide convenient ways to identify and manipulate preprocessor conditions and associated source language code.

In the exemplary embodiments described herein, a browser, viewer, and/or editor is provided for identifying, displaying, and rendering an interface for interacting with preprocessor variants. The browser, viewer, and/or editor can be referred to as a user control interface. Variants represent multiple designs embedded in the same design specification. A preprocessor variant is a type of variant written in a preprocessor language.

A source design is a specification including instructions that, when executed by a processor, provides functionality specified by the source design. A source design includes instructions in one or more languages. A source design written in one or more high-level languages may be provided to a compiler for conversion into a format that is compatible with a computer or other device, such as an embedded system. A source design may also be provided to a preprocessor language engine, if the source design includes instructions in a preprocessor language. The preprocessor language engine may control which instructions in a high-level language are provided to a compiler based on preprocessor directives embodied by the instructions in the preprocessor language.

Two or more languages may be employed in a single source design. For example, a first language (the preprocessor language) may be used to determine which part of the second language (the source language) is processed by the processing engine of the second language (e.g., a compiler).

The source design may include one or more instructions in a source language that can be executed on a computing system to simulate the behavior of a model. The source language instructions may also include source language instructions that can be executed on a target device.

The source design may also include one or more instructions in a preprocessor language for controlling which of the instructions in the source language will be provided to a compiler. Accordingly, the preprocessor language instructions control which source language instructions will be active in the executed code.

A source design may be generated, for example, by an execution engine in communication with a graphical modeling environment. In an alternative embodiment, the source design may be generated in a source design environment specifically for the purpose of creating and modifying source designs. Alternatively, a source design may be written using a text editor, or any interface suitable for creating or modifying source designs.

The source design may include automatically generated code. The automatically generated code may be generated from a graphical model, as described in more detail below. Generating code from a graphical model allows a user to, for example, produce executable source code related to the model, which may be simpler and faster than attempting to produce the code directly.

The source design may include instructions in a textual language. The source design may be in a graphical language, such as a source model language, and may be present in a graphical modeling environment, such as Simulink™ of the Mathworks, Inc. of Natick, Mass. The source design may also include a combination of textual and graphical instructions.

FIG. 1 depicts a portion of an exemplary source design 100. In FIG. 1, highlighted instructions are indicated by a dashed box around the instructions. The source design 100 includes instructions in a high-level source language, as well as instructions in a preprocessor language. For example, each of the highlighted source language instructions 110, 112 specifies an implementation for a controller in a modeled system. The source language instructions 110, 112 may be provided to a compiler, which may translate the source language instructions 110, 112 into instructions that are compatible with a computer or another electronic device, such as an embedded system. The instructions in the source language 110, 112 may be executed in order to implement functionality of the source design. The instructions may be executed, for example, by a processor in an electronic device. Alternatively, the instructions may be implemented in hardware, as may be the case for Hardware Description Language (HDL), and executed by hardware components.

The source design 100 further includes highlighted preprocessor language instructions 120, 122. The preprocessor language instruction 120 includes the preprocessor directive "#if LINEAR". The preprocessor directive includes the preprocessor symbol "LINEAR". A preprocessor symbol is a primitive data type used to identify or name a preprocessor element, such as a variable or function. A preprocessor symbol may be, for example, an environmental variable.

The preprocessor language instruction 120 specifies that when a certain preprocessor condition is fulfilled, the source language instructions 110 between the starting operator ("#if") and the ending operator ("#endif") should be processed by a compiler. In the case of the preprocessor language instruction 120, the preprocessor condition is "LINEAR", or in other words "LINEAR is true." Accordingly, if the symbol "LINEAR" is evaluated as "true", for example by a preprocessor language engine, then the source language instruction 110 is processed by a compiler. If the preprocessor symbol "NONLINEAR" is evaluated as "true", then the preprocessor language instruction 122 specifies that the source language instruction 112 should be processed by a compiler.

FIG. 2 graphically depicts a process for displaying active design elements for a source design and receiving user input to resolve unspecified preprocessor conditions in exemplary embodiments. A source design 200, which includes both preprocessor code and variants of design code, may be provided for use with exemplary embodiments described herein. In FIG. 2, the source design 200 is provided to a preprocessor language engine 202, and is also displayed on a display 204.

The source design 200 may include active design elements 210 and resolvable preprocessor conditions 220. The active design elements 210 include instructions in the source language which are provided to a compiler. The active design elements 210 may be instructions in a source language which are not governed by preprocessor language instructions (and which will therefore be provided to a compiler regardless of the preprocessor conditions embedded in the source design 200). Alternatively, the active design elements 210 may be instructions in a source language which are governed by preprocessor language instructions that have been resolved in favor of processing the active design elements 210.

The resolvable preprocessor conditions 220 include one or more preprocessor conditions included in the preprocessor instructions of the source design 200 which may be resolved by an input through a user control interface 240. The resolvable preprocessor conditions 220 may be preprocessor conditions which have not yet been resolved. For example, the preprocessor conditions may not have been resolved because no value has been provided for an environmental variable referenced in the preprocessor condition. Alternatively, the resolvable preprocessor conditions 220 may be preprocessor conditions which have been resolved, but which may be overridden. The preprocessor conditions may be overridden, for example based on user input provided through the user control interface 240.

One or more users may supply preprocessor input conditions through the user control interface 240. The preprocessor language engine 202 process the source design 200 and any received input. The preprocessor language engine 202 determines which code elements are active (e.g., active design elements 210), inactive, or undetermined, and what preprocessor conditions are resolvable 220. The status of code elements may be passed to the display 204 to control how the display 204 will show the code elements.

Figure 3:
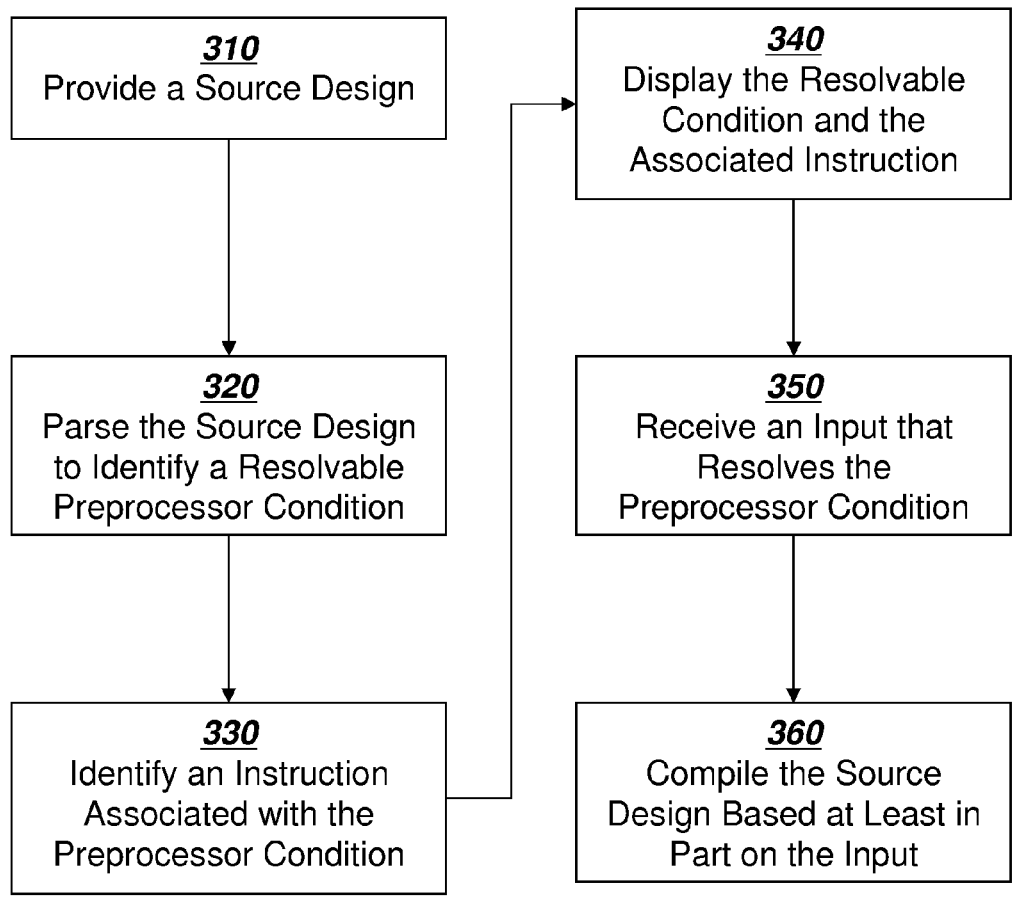
FIG. 3 is a flowchart depicting a method for providing a user control interface for identifying and manipulating preprocessor variants suitable for use with exemplary embodiments.

FIG. 3 is a flowchart depicting exemplary processing for providing a user control interface for identifying and manipulating preprocessor variants suitable for use with the exemplary user control interface described herein. The processing depicted in FIG. 3 may be employed in a computer or electronic device. For example, one or more of the processing acts may be performed using the computer. Instructions may be provided that, when executed by one or more processors associated with the computer, cause the one or more processors to implement the functionality of one or more of the processing acts.

Alternatively, the processing acts may be embedded as instructions in a tangible computer readable storage medium. Executing the instructions may cause one or more processors to implement the functionality of one or more processing acts.

The method depicted in FIG. 3 may also be embodied in a system or device. The system or device may include one or more processors for carrying out functionality of one or more of the processing acts.

As depicted in FIG. 3, a source design is provided at step 310. As discussed above, the source design may include source code written in one or more languages. In one embodiment, the source design includes one or more instructions in a source language and one or more instructions in a preprocessor language.

Each instruction in the preprocessor language may have a condition capable of having a value, and each preprocessor condition may be resolved or unresolved. A resolved preprocessor condition occurs when a value has been specified for the condition. In contrast, an unresolved preprocessor condition occurs when a value has not been specified for the condition. Each preprocessor condition may be associated with one or more instructions in the source language in that the preprocessor condition determines whether the associated one or more instructions will be active in the executed code, or whether the associated one or more instructions will be provided to a compiler.

At step 320, at least one resolvable condition is identified in an instruction in the preprocessor language. The resolvable condition may be a condition that may be evaluated to determine whether a certain action occurs, a certain instruction is evaluated, or included in the compiled version of the source design. The resolvable condition may be a portion of the instruction in the preprocessor language, or may be a complete instruction in the preprocessor language.

A resolvable condition is a condition which may be resolved through input. For example, a resolvable condition may include a condition that is an unresolved condition, and the input may resolve the unresolved condition. Alternatively, a resolvable condition may include a condition that is resolved, but the resolved condition may be capable of being overridden by an input specifying a new value for the condition. For example, a user may override a predefined or predetermined value for a preprocessor condition using a user control interface. The resolvable condition may be identified by, for example, parsing the source design to identify one or more instructions whose syntax corresponds to the preprocessor language. The resolvable condition may also be identified by searching the source design for an identifying symbol, such as the "#" symbol.

The resolvable condition may involve an unresolved or overridable preprocessor symbol. For example, the preprocessor instruction "#if LINEAR==1;" involves a resolvable condition ("LINEAR==1") with a single preprocessor symbol ("LINEAR"). In the preprocessor condition "#if LINEAR==1 && MODE==1", two preprocessor symbols are present in the resolvable condition ("LINEAR" and "MODE"). A preprocessor condition may involve any number of preprocessor symbols and may include multiple subconditions.

At step 330, at least one associated instruction in the source language that is associated with the resolvable condition is identified. The associated instruction may be associated with the resolvable condition because the resolvable condition relates to processing the at least one associated instruction, as described above.

At step 340, the resolvable condition and the at least one associated instruction may be displayed using a display device. Displaying the at least one associated instruction may include graphically indicating that the associated instruction is controlled by the resolvable condition. For example, the instructions in the source design may be color-coded such that the resolvable condition is presented in the same color as the instructions in the source language that are associated with the resolvable condition. Other instructions may be presented in a different color. Other exemplary methodologies for graphically indicating that the associated instruction is controlled by the resolvable condition include highlighting, type formatting, text positioning (such as visually nesting different lines of code, for example by tabbing), callout boxes, brightening or dimming code sections, and displayed tags, which may be graphical icons or textual tags.

In some embodiments, only the resolvable condition and the at least one associated instruction are displayed in a pane, panel, box, or other display element of a graphical user interface. In other embodiments, at least one non-associated instruction in the source language is displayed, which is not associated with the resolvable condition. A non-associated instruction is non-associated in that the resolvable condition does not relate to processing the at least one non-associated instruction. The non-associated instruction may be graphically indicated as not being controlled by the resolvable condition for example by using different coloring, distinctions in highlighting, typeface, or positioning, or any other method for graphically indicating a distinction between the resolvable condition and the non-associated condition.

Displaying the resolvable condition and the at least one associated instruction at step 340 may further include displaying additional information that relates to the associated instruction in the source language. In one embodiment, code coverage information may be displayed, which includes further information about the source language instructions that are active as determined by the preprocessor condition. For example, if a single preprocessor condition controls two or more separate sets of source language instructions and the at least one associated instruction is a subset of the separate sets, information regarding the other subsets of source language instructions controlled by the preprocessor condition may be displayed as additional information. The additional information may be displayed, for example, in a text box beside the resolvable condition or associated instruction, or in a call-out, pop-up window, or other display element.

At step 350, an input that provides a value for the resolvable condition may be received. The value may be provided through a user control interface. A user may provide the value using an input device (see, e.g., FIG. 6). The input may provide a value for the resolvable condition depending on the type of the resolvable condition. If the resolvable condition is capable of accepting a numerical value or text string, a numerical value or text string may be supplied. For example, in the resolvable condition "#if A==1", the resolvable condition is capable of taking a value for the environmental variable "A". Depending on the type of "A", a value may be supplied. In this example, "A" is capable of taking a numerical value, and the user may supply the value. If the user supplies the value "1" for "A", the resolvable condition may be resolved and is rendered "true". If the user supplies the value "2" for "A", the resolvable condition may be resolved and rendered "false".

In another embodiment, a user may supply a value for the resolvable condition by implying that a definition exists for an environmental variable, rather than providing an explicit value for the environmental variable. For example, if the resolvable condition is "#ifdef B", the resolvable condition is evaluated as "true" if "B" has been defined, and "false" if "B" is undefined. In this situation, a user may supply a value for the resolvable condition by implying a definition for "B." One exemplary user input supplying a value for this resolvable condition may be "#define B", which implies that "B" has been defined, even if no explicit value has been supplied for "B".

Alternatively, a value may be supplied for the entire resolvable condition, rather than only a variable within the resolvable condition. For example, in some embodiments, a user may simply supply the value "true" or "false" for a resolvable condition such as "#if A==1" or "#ifdef B".

The steps depicted in FIG. 3 need not be performed in the order shown. For example, the input may be received during edit-time, when a user writes a source design. This may allow the user to, for example, set an environmental variable at the time that the preprocessor instruction is included in the code. Alternatively, the input may be received when the plurality of instructions in the source language are compiled by a compiler, or before the instructions in the source language are compiled by the compiler. If the source design is generated based on a graphical model of a system, the input may be received when the graphical model is simulated, executed, or during code generation process.

Upon receiving the input, the resolvable condition may be conditionally resolved in a predefined section or scope. The outcome of resolving the resolvable condition may be displayed in conjunction with others sections or scopes that are not processed. This may allow the user to see the outcome of the supplied input and evaluate alternatives to the supplied input.

At step 360, the source design may be compiled based, at least in part, on the user input supplying a value for the resolvable condition. In one exemplary embodiment, at step 360 the preprocessor language engine may determine, based on the resolved preprocessor condition, which instructions in the source language will be provided to the source language compiler. The preprocessor language engine may remove instructions in the source language from the source design based on the value of the preprocessor conditions. The preprocessor language engine may also remove each of the instructions in the preprocessor language from the source design. Once the instructions are removed by the preprocessor language engine, the preprocessor language engine may provide the modified source design to the source language compiler.

Figure 12:
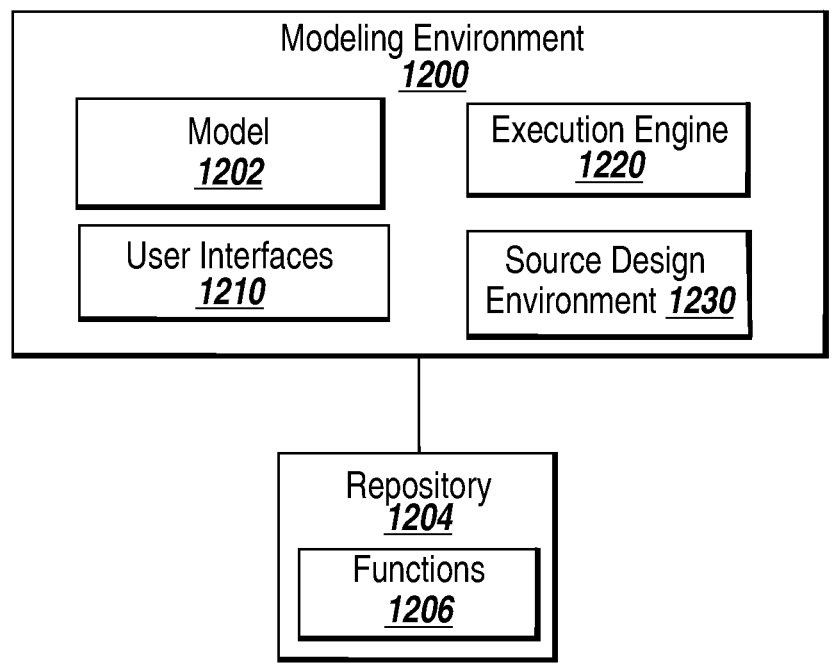
FIG. 12 depicts exemplary modeling environment 1100.

Alternatively, the source design may be used to generate a configuration in a separate file (e.g., source code files 1232 of FIG. 12). For example, the source design may be maintained with each of the instructions in the source language and the instructions in the preprocessor language in place, and a separate configuration file, including the input supplied at step 350, may be generated based on the source design. The configuration file may be stored to a memory or a storage of a computing device.

Figure 4:
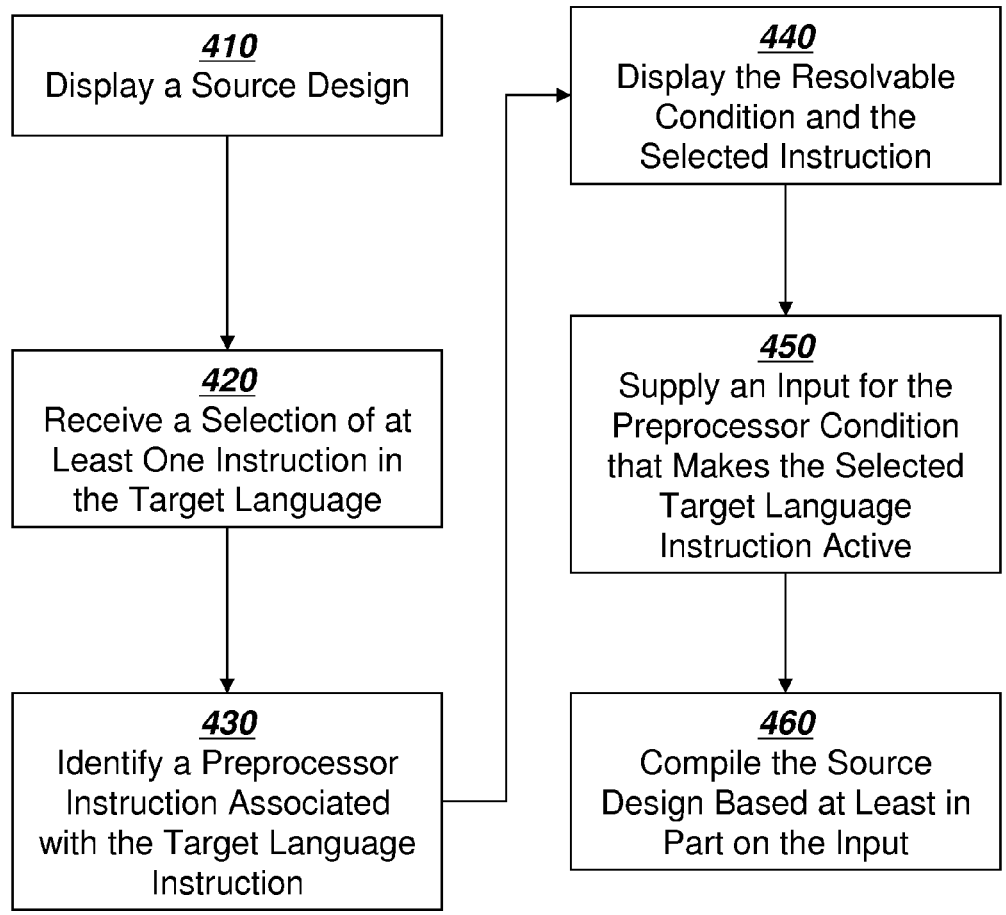
FIG. 4 is a flowchart depicting an alternative method for providing a user control interface for identifying and manipulating preprocessor variants suitable for use with exemplary embodiments.

FIG. 4 is a flowchart depicting an alternative method for providing a user control interface for identifying and manipulating preprocessor variants suitable for use with exemplary embodiments described herein. The embodiment depicted in FIG. 4 may allow a user to select one or more instructions in the source language and be presented with preprocessor conditions that relate to processing the selected instructions.

At step 410, a source design may be displayed. The source design may include at least one instruction in a preprocessor language and a plurality of instructions in a source language.

At step 420, a selection of at least one of the plurality of instructions in the source language may be received. The selection may be indicated by selecting the instructions with an input device, such as a mouse or keyboard. Alternatively, the selection may be identified with an identifier, such as a line number. The selection may also be indicated using a graphical identifier on the user control interface, such as a checkbox.

At step 430, an instruction in the preprocessor language that is associated with the selection and includes a resolvable condition may be identified. The resolvable condition may relate to processing the selection. The instruction in the preprocessor language may be identified in the same way as described above with respect to FIG. 3.

At step 440, the selected instructions and the resolvable condition may be displayed using a display device. The selected instruction may be graphically indicated as controlled by the resolvable condition. Alternatively, the resolvable condition may be highlighted, along with each of the instructions in the source language controlled by the resolvable condition. This may allow a user to, for example, select instructions in a source language, and view the preprocessor condition that controls the selected instructions along with any other instructions in the source language controlled by the resolvable condition.

In some embodiments, necessary and/or sufficient preprocessor conditions may be displayed such that the selected instructions in the source language become active. A necessary condition is a preprocessor condition which must be met in order to make the selected source language instructions active. A sufficient condition is a condition which, when met, makes the selected instructions active. Preprocessor conditions may be necessary, sufficient, necessary and sufficient, or neither necessary nor sufficient, as they relate to a selected condition.

At step 450, an input may be supplied for the resolvable condition such that the selection becomes active. The input may be supplied by a user, or may be supplied automatically by a preprocessor language engine based on a determination of what input or inputs would make the selection active. The preprocessor language engine may determine which resolvable conditions are necessary or sufficient to make the selection active, and which values are required to satisfy the preprocessor conditions. The input may relate to only a single preprocessor condition, if the preprocessor condition is a sufficient condition such that supplying a value for the preprocessor condition is enough to make the selection active. Alternatively, the input may relate to multiple preprocessor conditions, if more than one preprocessor condition is a necessary condition.

At step 460, the source design may be compiled based, at least in part, on the input. The preprocessor language engine may provide the source design, or a configuration file based on the source design, to the source language compiler as discussed above in relation to FIG. 3.

Figure 5:
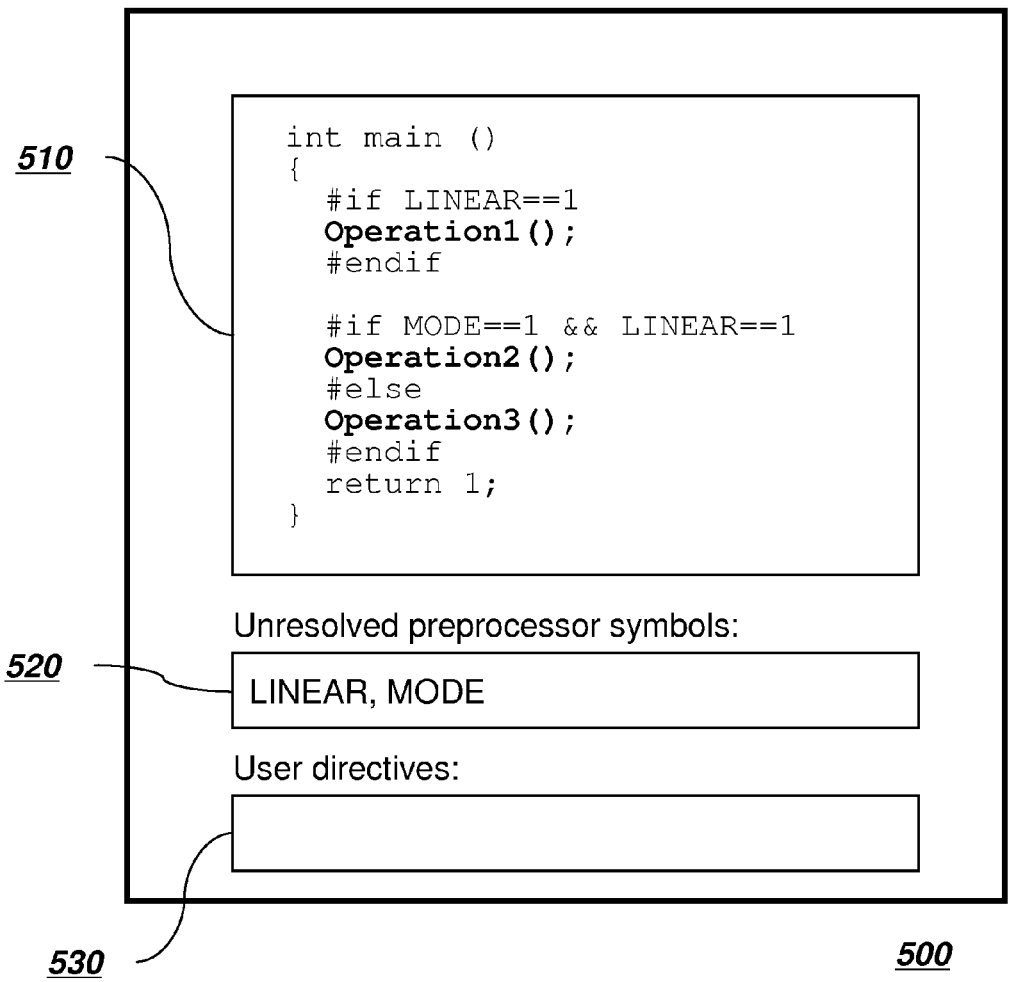
FIG. 5 depicts an exemplary user control interface suitable for use with exemplary embodiments.

FIG. 5 depicts an exemplary user control interface 500 suitable for use with exemplary embodiments described herein. The user control interface 500 allows a user to view and manipulate preprocessor conditions to make desired instructions in a source language active. The top interface 510 of the user control interface 500 may display all or a portion of a source design, with highlighting indicating variants that are unresolved. The top interface 510 may display the entire source design, or may display only a portion of the source design that is relevant to the user. The preprocessor language engine may determine which portions of the source design are most relevant to a user, for example based on a selection of instructions in either the source language or the preprocessor language provided by a user. If the entire source design cannot be displayed in the top interface 510, the top interface 510 may include scroll bars to view the rest of the source design, or only a relevant portion may be displayed.

In middle interface 520, the system provides a display that graphically indicates which preprocessor conditions, instructions, or symbols are resolvable. The resolvable symbols, conditions, or instructions may relate to the entire source design, or only to a relevant portion of the source design.

The bottom interface 530 provides a prompt for a user to provide additional information. For example, the user may provide instructions for defining or redefining preprocessor conditions. The input supplied in the bottom interface 530 may be provided by the user control interface 500 to the preprocessor language engine to resolve the resolvable conditions. The input supplied in the bottom interface 530 may or may not relate to the preprocessor conditions, instructions, or symbols displayed in the middle interface 520.

The resolvable condition for which the input is supplied in the bottom interface may be an unresolved condition, and the input may resolve the unresolved condition. Alternatively, the resolvable condition may include a predefined value, and the input may include an overriding value that overrides the predefined value.

Although the user control interface 500 is depicted with a top, middle, and bottom interface, more or fewer interfaces may also be employed. In addition, the interfaces may be arranged in any order or configuration. The interfaces may be part of the same window, as depicted in FIG. 5, or the interfaces may be provided in two or more different windows. In one embodiment, each interface is provided in a separate window.

Figure 6:
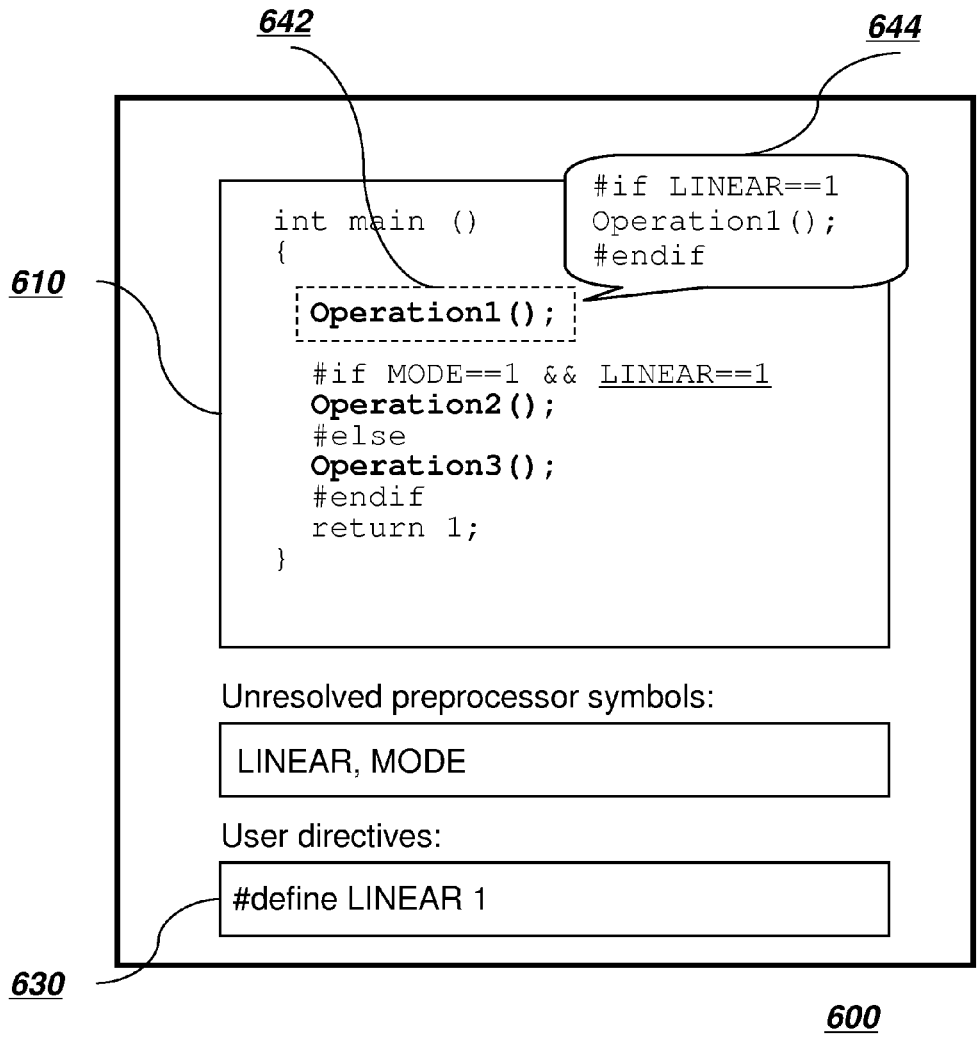
FIG. 6 depicts the user control interface of FIG. 5 after a user has provided a value for the LINEAR preprocessor condition.

FIG. 6 depicts a user control interface 600, which represents the user control interface of FIG. 5 after a user has provided a value for the LINEAR preprocessor symbol. In the bottom interface 630 of the user control interface 600 depicted in FIG. 6, a user has entered the command "#define LINEAR 1", which provides the value "1" for the LINEAR preprocessor symbol. The first code variants segment 642, including instructions in the source language, is now determined to be active because the preprocessor instructions define the first code variants segment 642 as active when the symbol LINEAR takes the value of "1". The code is accordingly displayed as active by the presence of highlighting (represented in FIG. 6 as a dashed line).

The now-resolved preprocessor condition is hidden in the top interface 610 for clarity of display. The code segment is marked by the above-mentioned highlighting, and the display of additional detailed information can be triggered through user actions, such as hovering the mouse over the highlighted active code. In FIG. 6, a cursor has hovered over the first code variants segment 642, and accordingly additional information is displayed in the call-out 644. The additional information in the present example relates to the preprocessor condition and related instructions which control the processing of the active first code variants segment 642.

When a complex variants control logic is used, the display will highlight the part of the logic that has been resolved, and will not highlight the parts of the logic that have not been resolved.

After an input is provided in the bottom interface 630, the input may be processed with existing information in the code in the preprocessor language engine. The preprocessor language engine may then cause the display to be updated with any changes effected by the input.

Figure 7:
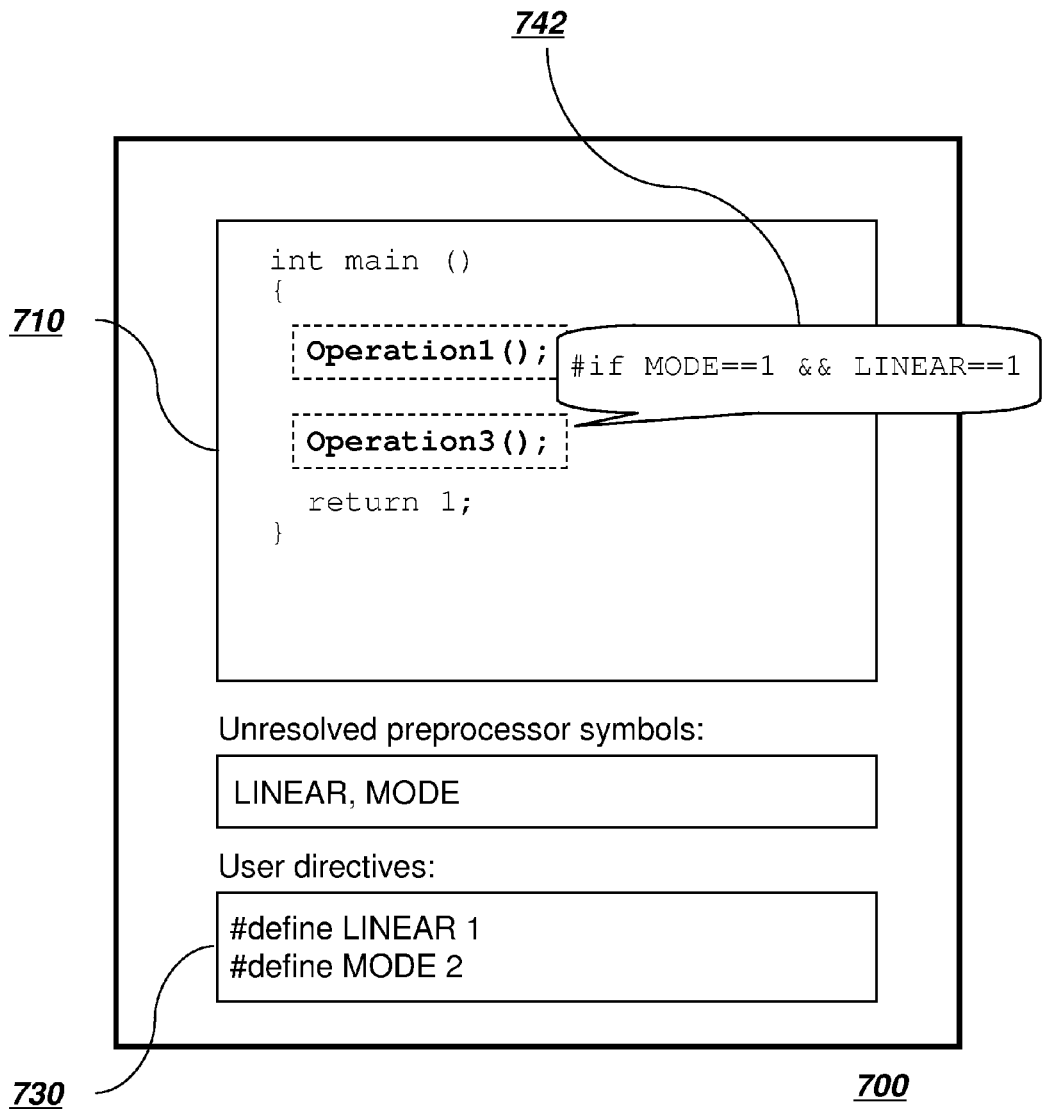
FIG. 7 depicts the user control interface of FIG. 6 after a user has provided a value for the MODE preprocessor condition.

FIG. 7 depicts a user control interface 700, which represents the user control interface of FIG. 6 after a user has provided a value for the MODE preprocessor symbol. In the example depicted in FIG. 7, a user continues to interact with the source design depicted in the top interface 710.

In FIG. 7, a user supplies the value "2" for the "MODE" preprocessor symbol in the bottom interface 730. Accordingly, the top interface 710 is updated. In the example depicted in FIG. 7, the details of a variants segment determined to be too long to be displayed in the call-out box 742. For example, in FIG. 7, the following code is related to the active source language instruction "Operation( );":

```
#if MODE==1 && LINEAR==1
    Operation2 ( );
#else
    Operation3 ( );
#endif
```

However, the user control interface 700 deems the above code to be too long to fit conveniently in the call-out box 742. Accordingly, only the most relevant information is displayed in the call-out box 742. The call-out box 742 displays only the fact that "Operation3( );" becomes active based on the preprocessor condition "#if MODE==1 && LINEAR==1". Based on the information in the bottom interface 730, the user can determine that the value of the symbol LINEAR is "1", and the value of the symbol "MODE" is 2.

Figure 8:
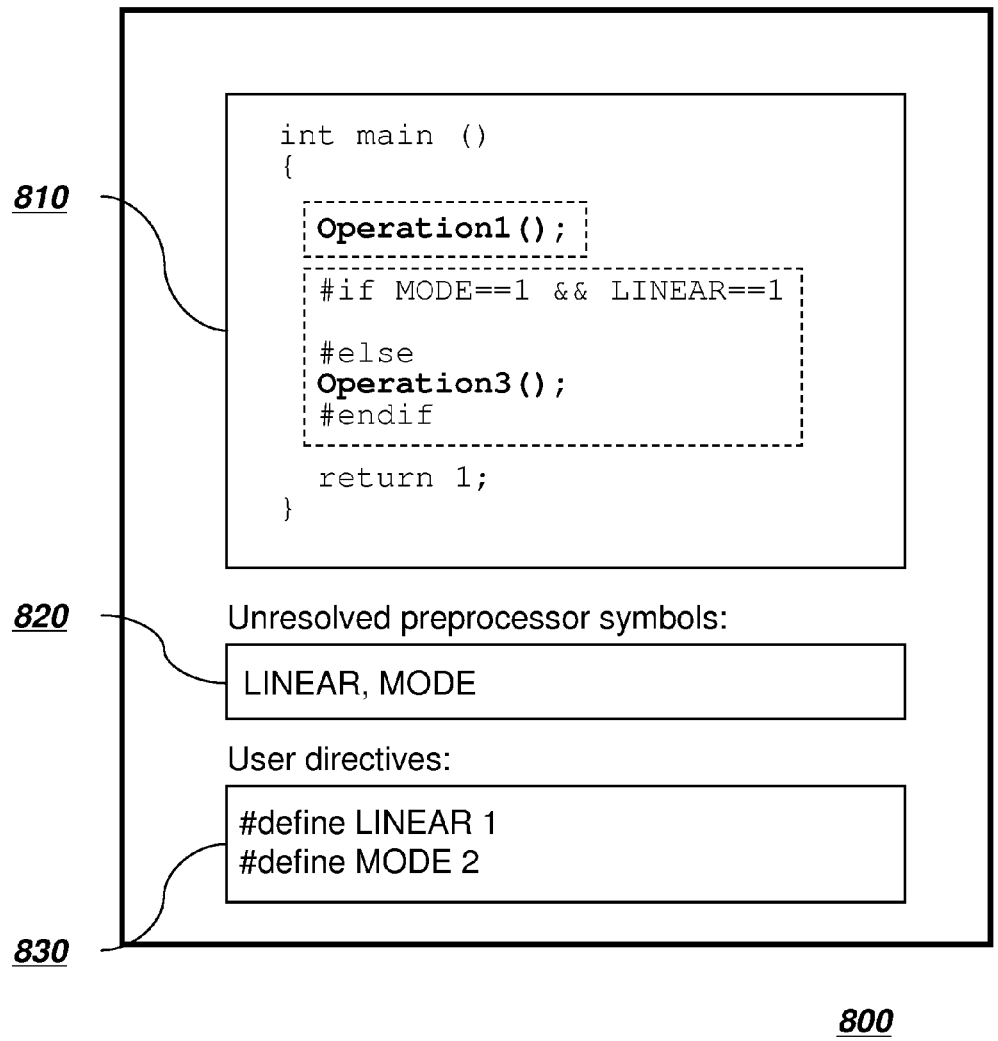
FIG. 8 depicts the user control interface of FIG. 7 after a user request for a full information display.

FIG. 8 depicts a user control interface 800, which represents the user control interface of FIG. 7 after a user request for a full information display. In this case, a user has requested a more full display of information than what was presented in the call out box above. The user control interface 800 may highlight and display a relevant portion of the instructions in the source language and/or the instructions in the preprocessor language to make it clear which instructions are active and which instructions are not. As depicted in FIG. 8, information that is not relevant to the active code section (such as the fact that "Operation2( );" becomes active when both LINEAR and MODE take the value "1") is hidden in the top window 810 for clarity.

The exemplary user control interface described above provides a number of benefits. For example, using the exemplary user control interface, users can view the current configuration of a source design that includes a number of different potential variants. Users may also experiment with a source design by changing the definitions or values of preprocessor conditions in order to determine how a changed preprocessor condition affects the final compiled code.

Further, users may override information already present in a source design, such as when a source design includes a preprocessor condition with a predefined or predetermined value. For example, if the source code in the source design includes the instruction "#define MODE 1", a user may specify an override such as "#define MODE 2", and the system will accept the users' override.

The exemplary embodiments described herein also support the display and manipulation of hierarchical variants. A hierarchical variant is a set of nested variants; for example:

```
#if MODE==1
    #if LINEAR==1
        Operation2 ( );
    #else
        Operation4 ( );
    #endif
#else
    Operation3 ( );
#endif
```

The exemplary embodiments described herein also support redirected variants. A redirected variant defines a second preprocessor directive in terms of a first preprocessor directive. For example:

```
#define ON LINEAR==1
#if ON
Operation1( );
#endif
```

The highlighting mechanism of the exemplary user control interface can also be synchronized with a model view of a graphical model of a system. For example, in FIG. 9, a portion 900 of a block diagram model is displayed. The model portion 900 represents a system including a left controller and a right controller. The model portion 900 includes a component 910, such as a block, that represents the functionality of the left controller, and a component 920, such as a block, that represents the functionality of the right controller.

The graphical block diagram model may include a component, such as a block, that represents a plurality of variants. Each of the plurality of variants may define a different functionality for the block, as in the model depicted in FIG. 9. Each of the blocks 910, 920 include a number of variants which may be implemented to specify a different functionality for the respective block 910, 920. In the exemplary model depicted in FIG. 9 each of the blocks 910, 920 may be implemented in a linear format or a nonlinear format. Each block 910, 920 represents one or more mathematical operations, which may be modeled directly as a nonlinear operation, or approximated as a linear operation. Engineers often use a linearized version of a system in the design and analysis of control systems and physical models.

Figure 9:
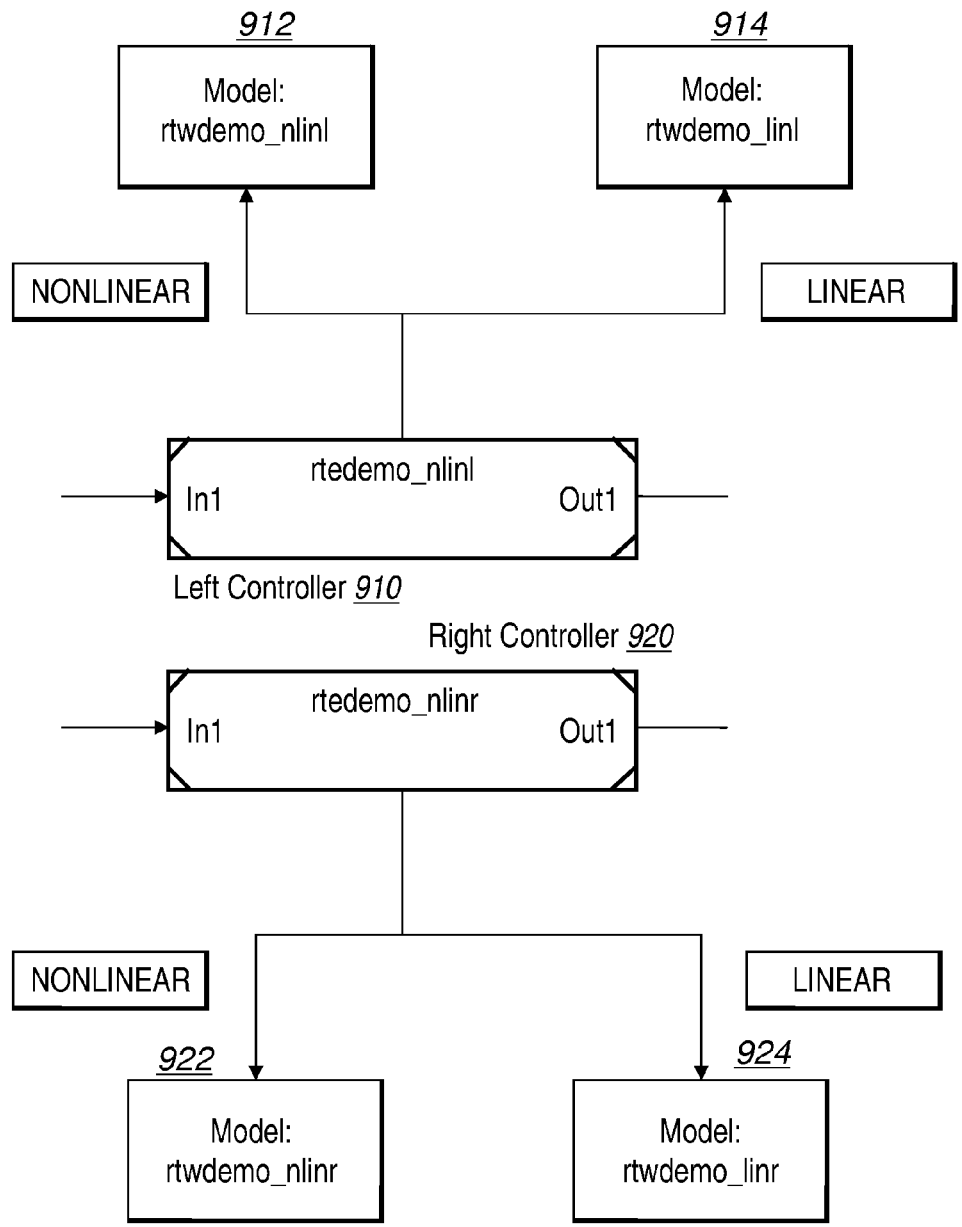
FIG. 9 depicts an exemplary block diagram model of a system 900 employing blocks that enable different variants to be selected in accordance with exemplary embodiments.

In the example depicted in FIG. 9, if the "NONLINEAR" preprocessor condition is active, models 912 and 922 are also designated as active, specifying a nonlinear implementation of the blocks 510, 520, respectively. If the "LINEAR" preprocessor condition active, models 914 and 924 are also designated as active, specifying a linear implementation of the blocks 910, 920, respectively. Each of the models 912, 914, 922, and 924 is a variant, which may be activated based on preprocessor conditions. A resolvable condition may identify which of the plurality of variants is active.

If the source design comprises high level source code generated from a graphical block diagram model, such as the block diagram model portion 900, then both the source design and the model may be displayed together. When one or more instructions are selected or highlighted in the source design, a corresponding component in the block diagram model may also be selected or highlighted in response, or vice versa. The component may be determined to correspond to the instructions because the instructions implement the functionality of the component.

If the source design was generated from a block diagram model, the input specifying a value for a preprocessor condition may be received during simulation, execution, or code generation of the block diagram model.

The source design interface described above is exemplary only. It is noted that, instead of displaying and specifying the preprocessor instructions and the source language instructions in a browser, the instructions can also be displayed and manipulated in other ways. For example, the preprocessor instructions may be provided programmatically, or through an API.

The exemplary embodiments described above relate to textual code, including textual code generated from a graphical block diagram model. However, the user control interface may also be employed with respect to graphical languages or with respect to the graphical block diagram model itself.

Figure 10:
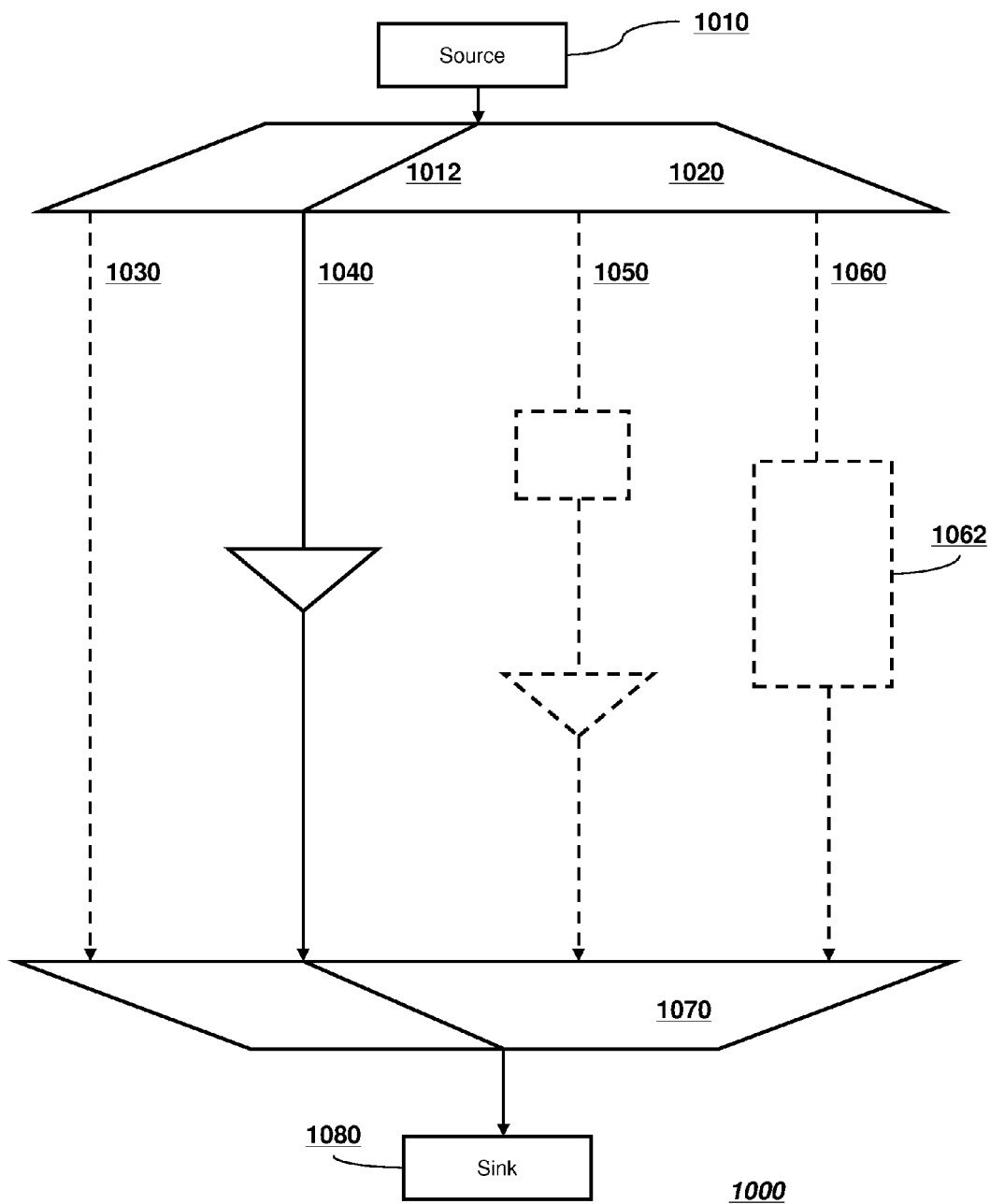
FIG. 10 depicts an exemplary user control interface for viewing and specifying preprocessor variants in relation to graphical instructions implemented in a graphical environment.

FIG. 10 depicts an exemplary user control interface for viewing and specifying preprocessor variants in relation to graphical instructions implemented in a graphical environment. A model 1000 is provided including four preprocessor variants, of which one preprocessor variant is designated as active. As in previously described embodiments, the active variant is highlighted or otherwise differentiated from the inactive variants. The components of the model may represent instructions in a source language, instructions in a preprocessor language, or both. In the model 1000 depicted in FIG. 10, the various model components represent instructions in a source language.

The model 1000 includes a source block 1010. The source block 1010 may provide information to be used by other blocks connected to the source block 1010 along a path 1012. Such a path 1012 may include one or more variants. In the model 1000, a variant start block 1020 indicates the beginning of a design section in the model that includes one or more variants. The path 1012 is connected to the variants through the variant start block 1020.

Four variants 1030, 1040, 1050, and 1060 are connected to the variant start block 1020. Any of the variants may be activated based on preprocessor conditions. In the model 1000, variants 1030, 1050, and 1060 are indicated as inactive. Inactive variants may be designated as inactive due to a graphical indication that differentiates the inactive variants from active variants. In the model 1000, inactive variants 1030, 1050, and 1060 are indicated by broken lines, which may indicate, for example, the absence of highlighting. Active variant 1040 is indicated by an unbroken line, which may indicate, for example, the presence of highlighting. The path 1012 is also shown connecting the source block 1010 through the active variant 1040. One of ordinary skill in the art will understand that there are a number of different ways to differentiate active variant sections from inactive variant sections, such as by providing different colors, dashed lines, dotted lines, solid lines, textual cues, or other indicators.

The inactive variant 1060 of the model 1000 further includes an inactive subsystem 1062. The subsystem 1062 may include further variants or other model components.

Each of the variants 1030, 1040, 1050, and 1060 are connected to a variant end block 1070, which indicates the end of a design section that includes variants in the model 1000. The path 1012 is connected to a sink block 1080 through the variant end block 1070. The sink block 1080 receives information and may, for example, output the information or otherwise use the information to control a process.

In some embodiments, a user interacting with the model 1000 may mouse over one or more of the components representing one or more variants in order to show unresolved, resolved, or resolvable preprocessor conditions related to the components. Such an embodiment may involve a callout box or other form of display, as described for example with respect to FIG. 7, above.

Figure 11:
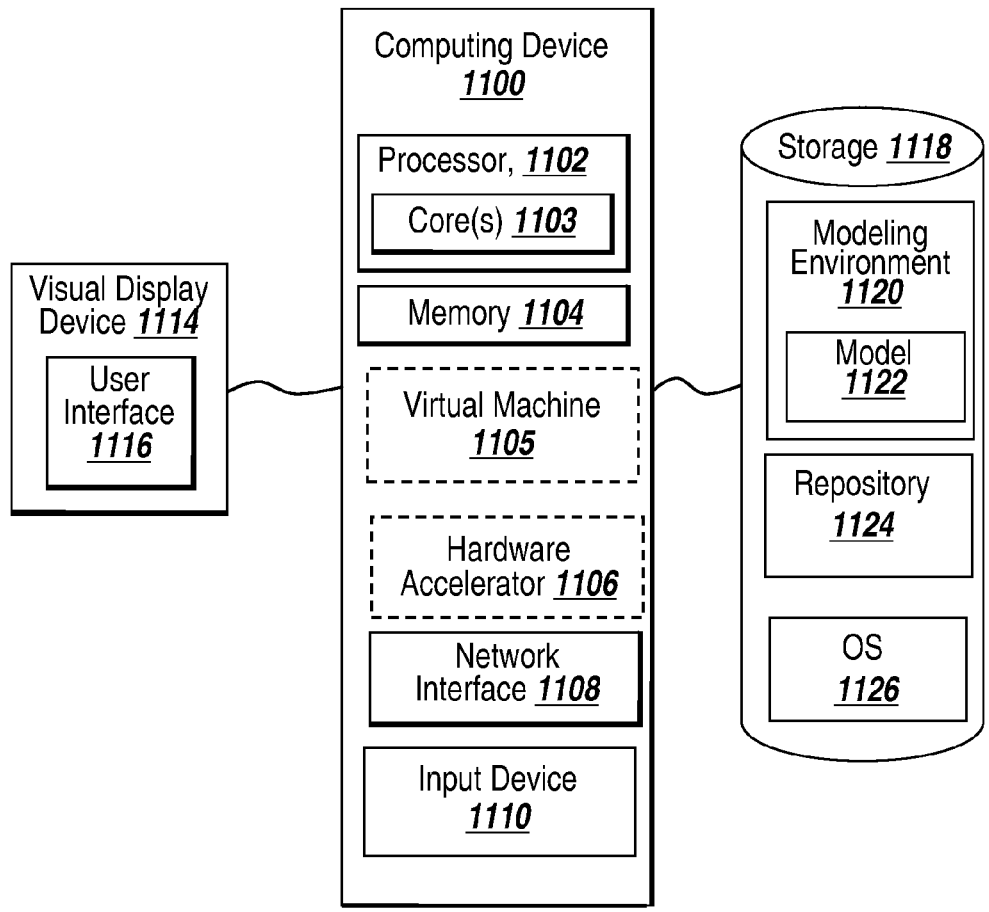
FIG. 11 depicts an exemplary computing device 1000 suitable for practicing exemplary embodiments.

FIG. 11 depicts an exemplary computing device 1100 suitable for practicing exemplary embodiments described herein. The computing device 1100 may take many forms, including but not limited to a computer, workstation, server, network computer, quantum computer, optical computer, Internet appliance, mobile device, a pager, a tablet computer, a smart sensor, application specific processing device, etc.

The implementation of FIG. 11 is illustrative and may take other forms. For example, an alternative implementation of the computing device 1100 may have fewer components, more components, or components that are in a configuration that differs from the configuration of FIG. 11. The components of FIG. 11 and/or other figures described herein may be implemented in hardware based logic, software based logic and/or logic that is a combination of hardware and software based logic (e.g., hybrid logic); therefore, the components of FIG. 11 and/or other figures are not limited to a specific type of logic.

The processor 1102 may include hardware or software based logic to execute instructions on behalf of the computing device 1100. In one implementation, the processor 1102 may include one or more processors, such as a microprocessor. In one implementation, the processor 1102 may include hardware, such as a digital signal processor (DSP), a field programmable gate array (FPGA), a Graphics Processing Unit (GPU), an application specific integrated circuit (ASIC), a general-purpose processor (GPP), etc., on which at least a part of applications can be executed. In another implementation, the processor 1102 may include single or multiple cores 1103 for executing software stored in a memory 1104, or other programs for controlling the computing device 1100.

The computing device 1100 may include one or more tangible computer-readable storage media for storing one or more computer-executable instructions or software for implementing exemplary embodiments. For example, a memory 1104 included in association with the computing device 1100 may store computer-executable instructions or software, e.g. instructions for implementing and processing every module of a programming environment. The memory 1104 may include a computer system memory or random access memory (RAM), such as dynamic RAM (DRAM), static RAM (SRAM), extended data out RAM (EDO RAM), etc. The memory 1004 may include other types of memory as well, or combinations thereof.

In one implementation, one or more processors 1102 may include virtual machine (VM) 1105 for executing the instructions loaded in the memory 1104. A virtual machine 1105 can be provided to handle a process running on multiple processors so that the process appears to be using only one computing resource rather than multiple. Virtualization can be employed in the computing device 1100 so that infrastructure and resources in the computing device can be shared dynamically. Multiple VMs 1105 may be resident on a single processor 1102.

A hardware accelerator 1106, such as implemented in an ASIC, FPGA, or the like, can additionally be used to speed up the general processing rate of the computing device 1100.

Additionally, the computing device 1100 may include a network interface 1108 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. Network interface 1108 may include a built-in network adapter, network interface card, personal computer memory card international association (PCMCIA) network card, card bus network adapter, wireless network adapter, universal serial bus (USB) network adapter, modem or any other device suitable for interfacing the computing device 1100 to any type of network capable of communication and performing the operations described herein.

The computing device 1100 may include one or more input/output (I/O) devices 1110 such a keyboard, a multi-point touch interface, or a pointing device, for example a mouse, for receiving input from a user. The computing device 1100 may include other suitable I/O peripherals.

The input devices 1110 may be connected to a visual display device 1114. A graphical user interface (GUI) 1116 may be shown on the display device 1114.

A storage device 1118 may also be associated with the computer 1100. The storage device 1118 may be, for example, a hard-drive, CD-ROM or DVD, Zip Drive, tape drive, or other suitable tangible computer readable storage medium capable of storing information. The storage device 1118 may be useful for storing application software programs, such as a modeling application or environment 1120 (which may be, for example the MATLAB® environment) including a model 1122, and for storing a repository 1124 and an operating system (OS).

The computing device 1100 can be running any operating system 1126 such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Exemplary embodiments may be provided as one or more computer-readable programs embodied on or in one or more mediums, such as a tangible, computer-readable storage medium. The mediums may be, but are not limited, to a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or even the genome in a cell nucleus.

In general, the computer-readable programs may be implemented in any programming language. Some examples of languages that may be used include Python, C, C++, C#, Java, Javascript, a hardware description language (HDL), UML, PLC, etc. Further, the computer readable programs may be implemented in a hardware description language or any other language that allows prescribing computation. The software programs may be stored on or in one or more mediums as object code. Instructions in the programming languages may be executed by one or more processors to implement the computer readable programs described in the programming languages, or alternatively the instructions may be implemented directly by hardware components other than a processor.

The exemplary user control interface described herein may be employed with a source design generated from a model developed in a modeling environment. FIG. 12 depicts a modeling environment 1200 and a repository 1224 in detail. The modeling environment 1200 may run on any operating system such as any of the versions of the Microsoft® Windows operating systems, the different releases of the Unix and Linux operating systems, any version of the MacOS® operating system for Macintosh computers, any embedded operating system, any real-time operating system, any open source operating system, any proprietary operating system, any operating systems for mobile computing devices, or any other operating system capable of running on the computing device and performing the operations described herein. Furthermore, the operating system and the modeling environment 1200 can be run from a bootable CD, such as, for example, KNOPPIX®, a bootable CD for GNU/Linux.

The modeling environment 1200 may enable a user to build and execute a model 1202 of a system. The modeling application or environment 1200 may include a text-based modeling environment. An exemplary text-based environment may be available in the MATLAB® environment, from The MathWorks, Inc., LabVIEW® or MATRIXx from National Instruments, Inc., Mathematica® from Wolfram Research, Inc., Mathcad of Mathsoft Engineering & Education Inc., Maple™ from Maplesoft, a division of Waterloo Maple Inc., Comsol from Comsol AB of Sweden, Scilab™ from The French National Institution for Research in Computer Science and Control (INRIA), Le Chesnay Cedex, France, GNU Octave, C++, JAVA, etc.

The modeling environment 1200 may include a graphical environment. An exemplary graphical environment may be available in the Simulink® environment, the SimEvents® environment, the Stateflow® environment, the SimMechanics™ environment, all from The MathWorks, Inc., LabVIEW® or MATRIXx from National Instruments, Inc., SoftWIRE by Measurement Computing, VisSim by Visual Solutions, WiT by DALSA Coreco, VEE Pro by Agilent, Dymola from Dynasim AB, Extend from Imagine That, Inc., Scicos from The French National Institution for Research in Computer Science and Control (INRIA), MSC.Adams® from MSC.Software Corporation, Rhapsody® and Rational® from International Business Machines Corporation, ARTiSAN Studio from ARTiSAN Software Tools, Inc., SCADE™ from Esterel Technologies, Inc., etc.

In the modeling environment 1200, instructions may be generated for the model 1202, such as source code, intermediate representations, etc., for example for simulation using the model or to execute the model on a target device. The user may also generate instructions that generate instructions for the model 1202 on the target device. The generated instructions may be stored in a repository 1204. The modeling environment 1200 may enable processing the model 1202 using the instructions previously stored in the repository 1204.

In an exemplary embodiment, the modeling environment 1200 may be coupled to the repository 1204 so that modeling environment 1200 can communicate with the repository 1204. A user may generate instructions for the model 1202 and store the instructions in the repository 1204. The instructions may be stored in the repository 1204, for example, as functions 1206 in software. The instructions may be stored in the repository 1204 in different form, such as processes that can be implemented in hardware. The instructions stored in the repository 1204 can be shared in processing other models to reduce memory or other requirements for processing other models.

The repository 1204 may refer to a collection of information stored in memory or storage. In an exemplary embodiment, the repository 1204 may be, for example, a database with the code for functions and the checksums for each function.

The modeling environment 1200 may include user interfaces 1210, an execution engine 1220, and a source design environment 1230, which will be described in greater detail below. The modeling environment 1200 may allow a user to build model 1202 of a system using user interfaces 1210. The model 1202 may include, for example, blocks and lines. The blocks may define operations, and the lines may define relationships between the blocks.

The execution engine 1220 may compile and link the model 1202 to generate an executable form of instructions for carrying out execution of the model. The model 1202 may be executed to simulate the system represented by the model 1202. The simulation of the model 1202 may determine the behavior of the system represented by the model 1202.

The execution engine 1220 may convert the model into the executable form of instructions using a directed graph. The execution engine 1220 may carry out the task of compiling and linking the model to produce an in-memory executable version of the model that is used for generating code and/or executing a model. The in-memory representation of the model may be executed to determine the behavior of the model. The compile stage may involve checking the integrity and validity of the component interconnections in the model. In this stage, the execution engine 1220 may also sort the components in the model into hierarchical lists that are used when creating the component method execution lists. In the link stage, the execution engine may use the result of the compiled stage to allocate memory needed for the execution of the various components of the model. The linking stage may also produce component method execution lists that are used by the execution of the model. The block method execution lists are generated because the simulation of a model may execute component methods by type (not by component) when they have a sample hit. The execution engine 1220 may repetitively execute the instructions e.g., via successive time steps from an execution start time to a stop time specified by the user or until the execution is interrupted.

The execution engine 1220 may enable interpretive execution of part or all of the model. Likewise, the execution engine 1220 may enable compiled or accelerated execution of part or all of the model. Combinations of interpretive and compiled or accelerated execution may also be enabled by the execution engine 1220.

A source design environment 1230 may be used to generate instructions from part or all of a model. The generated instructions may include source code, object code, a compiled executable or library for forming an executable. The source design environment 1230 may also be used to generate a hardware description language representation from part or all of the model 1202. The source design environment 1230 may use implementations of instructions for portions of the model 1202 to generate executable code, instructions, etc. in a programming language such as Java, Javascript, C or C++ or a hardware description language such as Verilog or VHDL. To generate instructions, the source design environment 1230 may convert a source representation to a source language. The source design environment 1230 may comprise an extended version of a code building tool such as Real-Time Workshop® from The MathWorks, Inc. of Natick, Mass. or any portion thereof, or may be substantially any software component for generating executable code, instructions, etc., in a programming language such as Java or C or in a hardware description language such as Verilog or VHDL. If instructions for a model are generated by the source design environment 1230, then the generated instructions may be compiled and linked to execute. In some cases, the user may deploy the instructions to a target device for execution.

Figure 13:
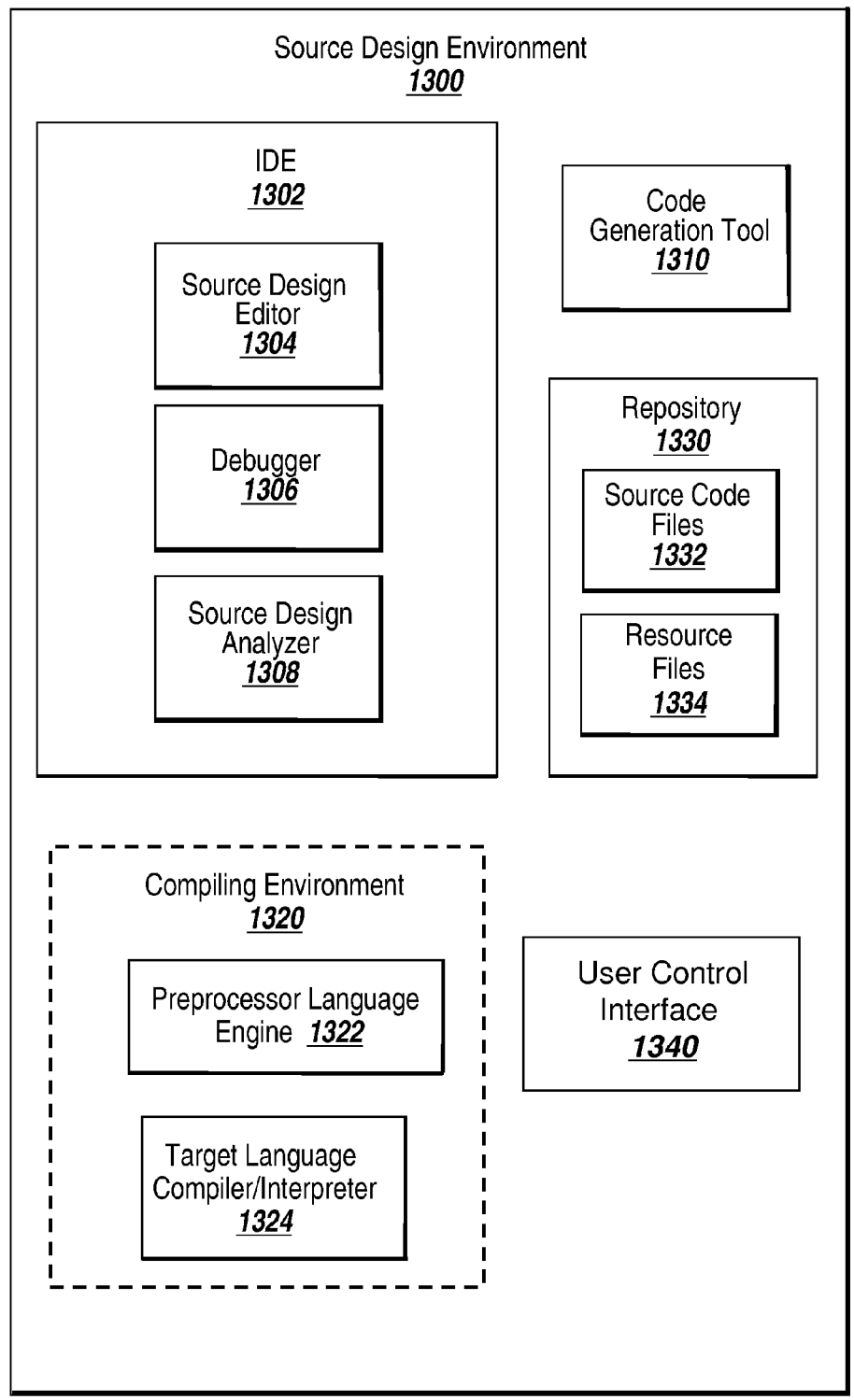
FIG. 13 depicts an exemplary source design environment 1200.

FIG. 13 depicts an exemplary source design environment 1300 suitable for use with embodiments described herein. A source design environment 1300 may be provided by configuring an existing integrated development environment (IDE) 1302 or as a stand-alone application including its own source code editor. The source design environment 1300 may be integrated into a modeling environment, or may be provided separately.

The source design environment 1300 may include an IDE 1302. The IDE 1302 may include one or more modules including, but not limited to, a source design editor 1304, a debugger 1306, and a source code analyzer 1308. The source code editor 1304 may be an editor program configured to allow display and editing of a source design including source code. The debugger 1306 may be a program configured to test and debug source code opened in the source code editor 1304.

If the source code crashes during execution, the debugger 1306 may show the location in the source code where the crash occurred. The source code analyzer 1308 may automatically analyze the behavior of the program embodied by source code opened in the source code editor 1304. For example, the analyzer 1308 may perform static code analysis (analysis of code performed without actually executing the programs built from the code), standard data flow analysis (information gathering about possible sets of values calculated at various points in a program), etc.

A code generation tool 1310 may be provided to automatically generate code. For example, the code generation tool may generate a source design based on a graphical block diagram model of a system. The code generation tool 1310 may be provided integrally with either a modeling environment or a source design environment, or may be provided separately.

A compiling environment 1320 may include a preprocessor language engine 1322 and a target language compiler and/or interpreter 1324. The preprocessor language engine 1322 may parse the source code to identify preprocessor directives, and then evaluate the preprocessor directives to determine whether different segments of the source code should be compiled. The preprocessor language engine 1322 may filter out instructions from the source code which are not active, for example based on preprocessor conditions in the modeling environment (such as environmental, global, or local variables). The compiler/interpreter 1324 may compile or interpret source code opened in the source code editor 1302. The compiler/interpreter may receive a modified version of the source design from the preprocessor language engine 1322.

The repository 1330 may include one or more source code files 1332, each containing source code. The repository 1330 may also include resource files 1334, such as header libraries for use with source code.

The source design environment 1300 may further include a user control interface 1340 for providing a browser, viewer, or editor for displaying and manipulating a source design including preprocessor variants.

The source design environment 1300 may be provided on a single computing device, on multiple computing devices (e.g., in a distributed configuration), and/or in other configurations (e.g., a multi-core implementation operating on one or more platforms). Exemplary embodiments may be provided integrally with an existing IDE. Exemplary embodiments may also be provided as a stand-alone application including its own source code editor.

Figure 14:
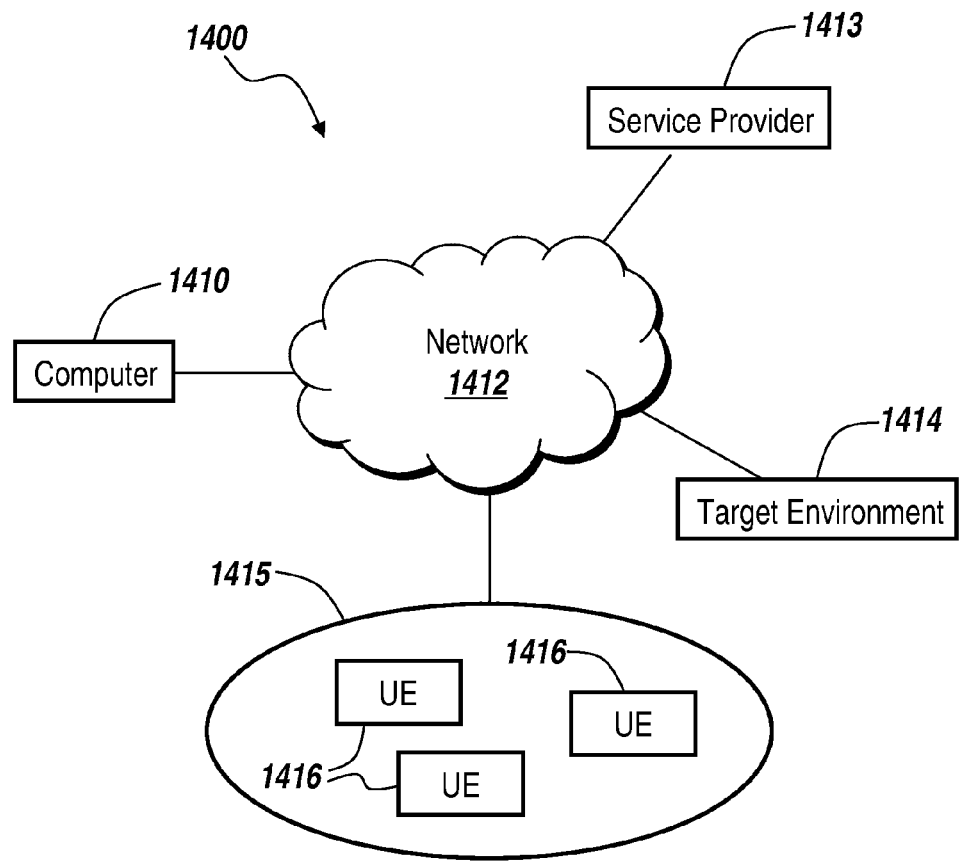
FIG. 14 depicts a networked system 1300 suitable for practicing exemplary embodiments.

FIG. 14 illustrates an exemplary distributed implementation suitable for use with the exemplary embodiments described herein. A system 1400 may include a computer 1410, a network 1412, a service provider 1413, a target environment 1414, and a cluster 1415. The embodiment of FIG. 14 is exemplary, and other embodiments can include more devices, fewer devices, or devices in arrangements that differ from the arrangement of FIG. 14.

The network 1412 may transport data from a source to a destination. Embodiments of the network 1412 may use network devices, such as routers, switches, firewalls, and/or servers (not shown) and connections (e.g., links) to transport data. 'Data,' as used herein, may refer to any type of machine-readable information having substantially any format that may be adapted for use in one or more networks and/or with one or more devices (e.g., the computer 1400, the service provider 1413, etc.). Data may include digital information or analog information. Data may further be packetized and/or non-packetized.

The network 1412 may be a hardwired network using wired conductors and/or optical fibers and/or may be a wireless network using free-space optical, radio frequency (RF), and/or acoustic transmission paths. In one implementation, the network 1412 may be a substantially open public network, such as the Internet. In another implementation, the network 1412 may be a more restricted network, such as a corporate virtual network. The network 1412 may include Internet, intranet, Local Area Network (LAN), Wide Area Network (WAN), Metropolitan Area Network (MAN), wireless network (e.g., using IEEE 802.11, Bluetooth, etc.), etc. The network 1412 may use middleware, such as Common Object Request Broker Architecture (CORBA) or Distributed Component Object Model (DCOM). Implementations of networks and/or devices operating on networks described herein are not limited to any particular data type, protocol, architecture/configuration, etc.

The service provider 1413 may include a device that makes a service available to another device. For example, the service provider 1413 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The target environment 1414 may include a device that receives information over the network 1412. For example, the target environment 1414 may be a device that receives user input from the computer 1410.

The cluster 1415 may include a number of units of execution (UEs) 1416 and may perform processing on behalf of the computer 1400 and/or another device, such as the service provider 1413. For example, in one embodiment, the cluster 1415 may perform parallel processing on an operation received from the computer 1400. The cluster 1415 may include UEs 1416 that reside on a single device or chip or that reside on a number of devices or chips.

The units of execution (UEs) 1416 may include processing devices that perform operations on behalf of a device, such as a requesting device. In one embodiment, a UE can be a microprocessor, field programmable gate array (FPGA), and/or another type of processing device. Embodiments of UE 1416 may include code, such as code for an operating environment. For example, a UE may run a portion of an operating environment that pertains to parallel processing activities. In one embodiment, the service provider 1413 may operate the cluster 1415 and may provide interactive optimization capabilities to the computer 1410 on a subscription basis (e.g., via a web service).

Units of Execution (UEs) provide remote/distributed processing capabilities for our products, such as MATLAB® from The MathWorks, Inc. A hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores, and in another implementation, the hardware unit of execution may include a number of processors. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g., a technical computing environment, a worker, a lab, etc.) that performs and/or participates in parallel programming activities. For example, a software unit of execution may perform and/or participate in parallel programming activities in response to a receipt of a program and/or one or more portions of the program. A software unit of execution may perform and/or participate in substantially any type of parallel programming using one or more hardware units of execution. Embodiments of a software unit of execution may support one or more threads and/or processes when performing processing operations.

The term 'parallel programming' may be understood to include multiple types of parallel programming, e.g. task parallel programming, data parallel programming, and stream parallel programming. Parallel programming may include any type of processing that can be distributed across two or more resources (e.g., software units of execution, hardware units of execution, processors, microprocessors, clusters, labs, etc.) and be performed at substantially the same time.

For example, in one implementation, parallel programming may refer to task parallel programming where a number of tasks are processed at substantially the same time on a number of software units of execution. In task parallel programming, each task may be processed independently of other tasks executing at the same time (e.g., a first software unit of execution executing a first task may not communicate with a second software unit of execution executing a second task).

In another implementation, parallel programming may refer to data parallel programming, where data (e.g., a data set) is parsed into a number of portions that are executed in parallel using two or more software units of execution. In data parallel programming, the software units of execution and/or the data portions may communicate with each other as processing progresses.

In still another implementation, parallel programming may refer to stream parallel programming (also referred to as pipeline parallel programming). Stream parallel programming may use a number of software units of execution arranged in series (e.g., a line) where a first software unit of execution produces a first result that is fed to a second software unit of execution that produces a second result. Stream parallel programming may also include a state where task allocation may be expressed in a directed acyclic graph (DAG) or a cyclic graph with delays).

Other implementations may combine two or more of task, data, or stream parallel programming techniques alone or with other types of processing techniques to form hybrid-parallel programming techniques.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while a series of acts has been described above, the order of the acts may be modified in other implementations consistent with the principles of the invention. Further, non-dependent acts may be performed in parallel.

In addition, implementations consistent with principles of the invention can be implemented using devices and configurations other than those illustrated in the Figures and described in the Specification without departing from the spirit of the invention. Devices and/or components may be added and/or removed from the implementations of the figures depending on specific deployments and/or applications. Also, disclosed implementations may not be limited to any specific combination of hardware.

Furthermore, certain portions of the invention may be implemented as logic that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise.

The scope of the invention is defined by the claims and their equivalents.

The invention claimed is:

1. A non-transitory computer memory device storing instructions, the instructions comprising:
   one or more instructions that, when executed by one or more processors, cause the one or more processors to:
   analyze a source design, to identify within the source design:
      at least one instruction in a preprocessor language, and
      a plurality of instructions in a source language;
   identify a resolvable condition in the at least one instruction in the preprocessor language;
   identify at least one associated instruction of the plurality of instructions in the source language, the associated instruction:
      being associated with the resolvable condition, wherein the resolvable condition relates to processing the at least one associated instruction;
      determine that the resolvable condition is unresolved and has no value when the resolvable condition is identified;
   present for displaying on a user interface:
      the unresolved resolvable condition,
      the at least one associated instruction in connection with the unresolved resolvable condition, and
      a prompt for an input to resolve the resolvable condition;
   receive an input via the user interface, the input providing the value for the resolvable condition, activating the at least one associated instruction, and being received during the analysis of the source design; and
   processing the source design in accordance with the provided value for the resolvable condition.

2. The memory device of claim 1, further storing instructions that, when executed by the one or more processors, cause the one or more processors to:
   display at least one non-associated instruction in the source language that is not associated with the resolvable condition, wherein the resolvable condition does not relate to processing the at least one non-associated instruction, wherein the at least one non-associated instruction is graphically indicated as not being controlled by the resolvable condition.

3. The memory device of claim 1, further comprising instructions that, when executed by one or more processors: cause the one or more processors to compile the plurality of instructions in the source language based on the input.

4. The memory device of claim 1, wherein the source design comprises:
high level source code generated from a block diagram model.

5. The memory device of claim 4, wherein the block diagram model comprises:
a block that represents a plurality of variants, each of the plurality of variants defining a different functionality for the block.

6. The memory device of claim 5, wherein the resolvable condition identifies which of the plurality of variants is active.

7. The memory device of claim 6, further storing instructions that, when executed by one or more processors, cause the one or more processors to:
display the block diagram model.

8. The memory device of claim 7, further storing instructions that, when executed by the one or more processors, cause the one or more processors to:
highlight at least one of the instructions in the source design; and
highlight an element in the block diagram model that corresponds to the at least one of the instructions in the source design.

9. The memory device of claim 1, further storing instructions that, when executed by the one or more processors, cause the one or more processors to:
store a configuration comprising the input to a memory of a computing device associated with one of the one or more processors.

10. The memory device of claim 1, wherein the user interface is a panel of a graphical user interface and the resolvable condition and the at least one associated instruction are displayed in the panel, and only the resolvable condition and the at least one associated instruction are displayed in the panel.

11. A method performed in a computing device, comprising:
analyzing by the computing device a source design, to identify within the source design:
at least one instruction in a preprocessor language, and a plurality of instructions in a source language;
identifying a resolvable condition in the at least one instruction in the preprocessor language, the resolvable condition capable of having a value;
identifying at least one associated instruction of the plurality of instructions in the source language, the at least one associated instruction being associated with the resolvable condition,
wherein a state of the resolvable condition relates to processing the at least one associated instruction;
determining that the resolvable condition is unresolved and has no value when the resolvable condition is identified;
presenting for display on a user interface:
the unresolved resolvable condition,
the at least one associated instruction in connection with the unresolved resolvable condition, and
a prompt for an input to resolve the resolvable condition;
receiving an input via the user interface, the input providing the value for the resolvable condition, activating the at least one associated instruction, and being received during the analysis of the source design; and
processing the source design in accordance with the provided value for the state of for the resolvable condition.

12. The method of claim 11, further comprising:
displaying at least one non-associated instruction in the source language, wherein the resolvable condition does not relate to processing the at least one non-associated instruction,
wherein the at least one non-associated instruction is graphically indicated as not being controlled by the resolvable condition.

13. The method of claim 11, wherein the source design comprises high level source code generated from a graphical block diagram model.

14. The method of claim 13, wherein the graphical block diagram model comprises:
a block that represents a plurality of variants, each of the plurality of variants defining a different functionality for the block.

15. The method of claim 14, wherein the resolvable condition identifies which of the plurality of variants is active.

16. The method of claim 11, further comprising storing a configuration comprising the input to a memory of a computing device associated with one of the one or more processors.

17. A system comprising:
a memory for storing a source design,
the source design comprising at least one instruction in a preprocessor language, and a plurality of instructions in a source language; a processor for:
analyzing the source design to identify within the source design the at least on instruction in the preprocessor language and the plurality of instructions in the source language,
identifying a resolvable condition in an instruction in the preprocessor language,
determining that the resolvable condition is unresolved and has no value when the resolvable condition is identified.
identifying at least one associated instruction of the plurality of instructions in the source language that is associated with the resolvable condition,
wherein the resolvable condition relates to processing the at least one associated instruction, present for display on a user interface:
the unresolved resolvable condition, and
a prompt for an input to resolve the resolvable condition;
receiving an input via the prompt of the user control interface, the input providing the value for the resolvable condition, activating the at least one associated instruction, and being received during the edit time analysis of the source design; and
processing the source design in accordance with provided value for the resolvable condition.

18. The non-transitory computer memory device of claim 1 wherein the analysis of the source design is performed during edit time of the source design.

19. The method of claim 11 wherein the analyzing occurs during edit time of the source design.

20. The system of claim 17 wherein the analyzing by the processor is during edit time of the source design.

* * * * *